Oct. 20, 1959     R. E. McKINLEY ET AL     2,909,153
ANIMAL HOIST
Filed Nov. 29, 1957
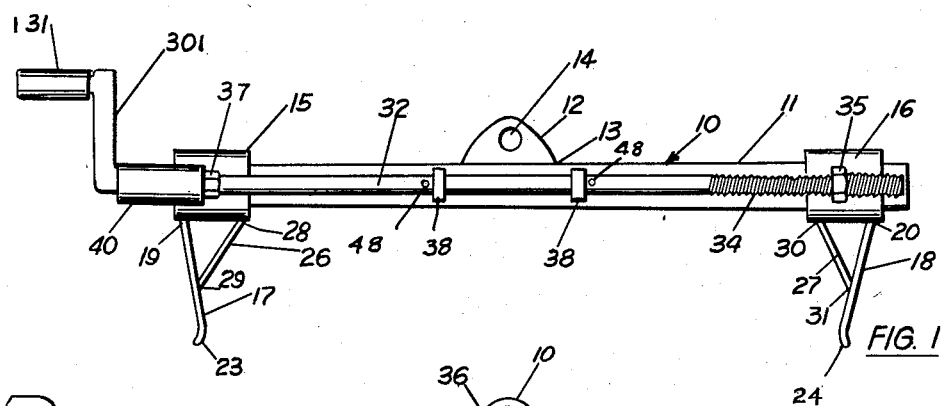
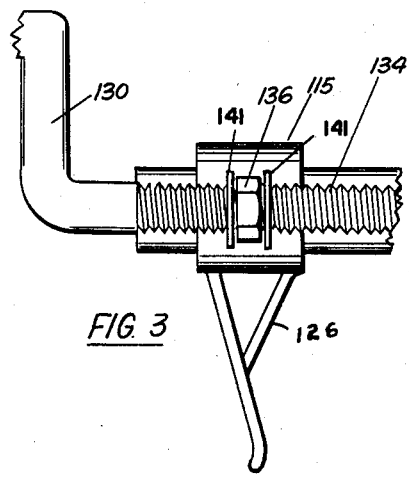
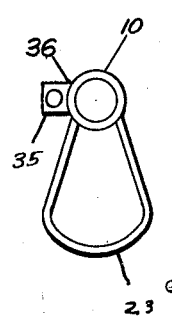
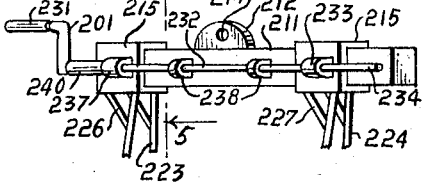
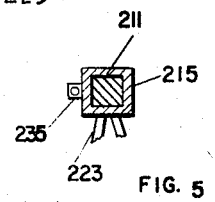
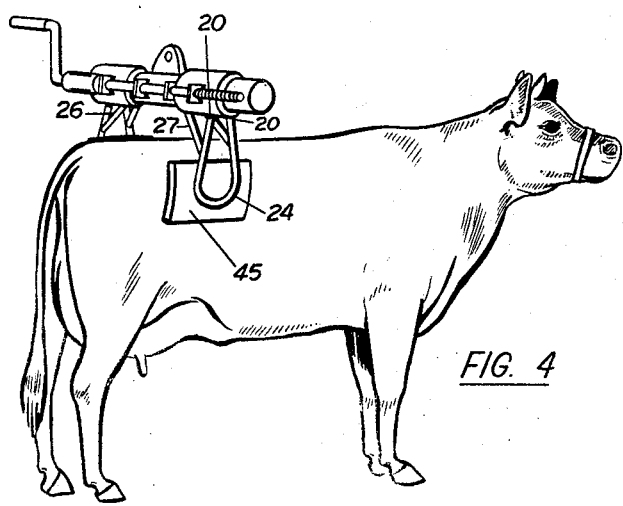
INVENTORS
RAYMOND E. McKINLEY
SIDNEY J. MICHAEL
BY Charles L. Lovercheck
attorney United States Patent Office 2,909,153
Patented Oct. 20, 1959

2,909,153
ANIMAL HOIST
Raymond E. McKinley and Sidney J. Michael, Erie, Pa.
Application November 29, 1957, Serial No. 699,819
3 Claims. (Cl. 119—100)

This invention relates to hoists for lifting animals and, more particularly, to hoists for lifting sick animals and animals such as cattle whose anatomy is such as to render a hoist of the girth type unsuitable and for use on animals having protruding hip bones of suitable structure to be adapted for use with the device disclosed herein.

A problem frequently encountered in the field of animal husbandry, especially in connection with cattle, is the matter of raising the animals to their feet when they have become partially paralyzed in their extremities due to injury or illness. Often, when the animal is lifted to a walking position, it can maintain itself in this position or be so maintained by the use of the device disclosed herein and the recovery of the animal to normal health due to improved circulation of blood and relieved pressure on the nerves is more rapid.

The device disclosed herein has the advantage that it may be clamped to the animal from above and, therefore, eliminates the necessity of working a girth type hoist under the body of the animal which is lying down. Further, hoists of the girth type cause considerable discomfort to the animal and render treatment of various kinds of ailments more difficult. Further, for purposes of examination, diagnosis, and treatment of disorders such as fractures, lesions, and injuries of many kinds by a veterinarian, it is desirable and sometimes mandatory for the animal to be positioned in the normal standing attitude.

It has been discovered that cows which have to be raised to a standing position frequently by ordinary methods will not try to help themselves, even though they may be physically able to materially assist in raising themselves, but with the use of device disclosed herein, the animal will often be reminded to try to get up when the operator applies the device to the hips of the animal and as soon as the operator starts to put the device in place on the animal, the animal will immediately endeavor to raise itself.

It is, accordingly, an object of this invention to overcome the above and other defects in prior animal hoists and, more particularly, it is an object of this invention to provide a hoist for animals which is simple in construction, economical to manufacture, and simple and efficient to use.

Another object of this invention is to provide an animal hoist which enables the operator thereof to position the device on the animal from above and conveniently and positively clamp the device securely in position on the animal prior to the lifting process.

A further object of the invention is to provide an improved hoist for lifting animals.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:
Fig. 1 is a side view of a lifting device according to the invention;
Fig. 2 is an end view of the device shown in Fig. 1;
Fig. 3 is a side view of an alternative form of the device;
Fig. 4 is a view of the device applied to an animal;
Fig. 5 is a cross sectional view taken on line 5—5 of Fig. 6; and
Fig. 6 is a perspective view of another embodiment of the invention.

Now with more particular reference to the drawing, a lifting device 10 is shown having a main lifting bar 11 which may be made of a cylindrical elongated bar of steel or other suitable material. The lifting bar 11 must be of sufficient strength and size to act as a beam supported at the center and having the weight of the animal to be lifted suspended from the ends thereof.

The lifting bar 11 has a center pad 12 attached thereto at the top edge thereof at 13 by welding, brazing, or other well known fastening means. The pad 12 has a hole 14 formed therein for receiving the hook of a chain hoist, differential hoist, block and tackle, rope fall, or the like. The center pad 12 may be made of a steel plate or other suitable material or it could be in the form of an eye bolt attached to the bar 11 by welding or other suitable means.

Clamp sleeves 15 and 16 may be made of steel and formed of one and one-half inch pipe having a suitable internal diameter for telescopically receiving the main lifting bar 11 and being slidably disposed thereon. The clamp sleeves 15 and 16 each have lifting loops 17 and 18 attached thereto at 19 and 20, respectively. The lifting loops 17 and 18 may be made of steel rods five-eighths of an inch in diameter, for example, or they could be made of elongated members of other material and in any suitable shape. The lifting loops 17 and 18 extend downwardly and inwardly and are made generally in a U-shape with bight portions 23 and 24 suitable for being disposed around the hip bones of an animal with the hip bones being disposed inside the U-shaped portion.

The lifting loops 17 and 18 are held in rigid position by means of inwardly and upwardly extending braces 26 and 27 which are attached to the clamp sleeves 15 and 16 at 28 and 29 and at 30 and 31, respectively, by welding, brazing, or other well known attaching means.

A crank 301 has a hand engaging portion 131 rotatably attached thereto in a conventional manner. The crank 301 has a laterally extending rod 32 integrally attached thereto which extends laterally and in parallel with and spaced from the lifting bar 11. The rod 32 may be made of steel, brass, or other suitable material and has a threaded end 34. A nut 35 is welded to the clamp sleeve 16 at 36 and a nut 37 is welded to the clamp sleeve 15. The nut 37 is bored to rotatably receive the rod 32 and, in like manner, spaced nuts 38 are welded to the main lifting bar 11 and are bored to receive the rod 32 therein. A spacer pipe 40 is rotatably received on the rod 32 and forms a spacer for holding the crank 301 in a uniformly spaced relation from the nut 37 so that the operator can rotate the crank 301 without injury to his hand. Pins 48 are fixed in the rod 32 and extend radially therefrom and prevent lateral movement of the rod 32.

During operation, the bight portions 23 and 24 will be slipped over the hips of an animal with a sponge rubber pad 45 or other suitable protecting pad disposed therebetween to prevent injury to the animal's hips. The operator will rotate the crank 301 to cause the threads 34 to move the lifting loops 17 and 18 apart until they are spaced wide enough apart to receive the body of an animal therebetween and can be slipped down over the hips of the animal. Then the operator will rotate the crank 301 in the opposite direction to cause the threads 34 to move the sleeve 16 inwardly to exert a force between the nut 35 and the nut 37 to draw the clamp sleeves 15 and 16 together, thereby exerting a compressive force on the animal's body between the lifting loops 17 and 18 and causing the animal's hips to protrude through the opening between the legs of the U-shaped loops 17 and 18. When the operator has the pressure on the animal's body adjusted to a suitable value, he may hook a suitable hoisting arrangement in the hole 14 and the animal can then be lifted to its feet.

In the embodiment of the invention shown in Fig. 3, a device similar to that shown in Figs. 1 and 2 is disclosed; however, in this figure, the rod attached to a crank 130 has a thread of an opposite incline to that on the other end thereof; that is, threads 134 are left handed and threads corresponding to the threads 34 would be right handed. Also, lugs 141 are spaced welded to a sleeve 115 and a nut 136 is freely disposed therebetween but restrained against rotation by a flat side thereof engaging the edge of the sleeve 115. This allows the device to flex without exerting an undue stress on the nuts 37 as might be the case under some conditions with the embodiment shown in Fig. 1. The threads 34 are right hand threads, the threads 134 are left hand threads, and the nut 136 will not be bored out but will be threaded instead of being bored as is the nut 35 shown in Fig. 1. Therefore, the spacer pipe 40 will be eliminated and when the crank 130 is rotated, the clamp sleeve 115 will be moved toward the center at the same rate that the clamp sleeve 16 is moved toward the center and the pad 12 will be maintained exactly in the center between the sleeves 15 and 16. This is advantageous in certain applications. The brace is indicated at 126.

The embodiments of the invention in Figs. 5 and 6 show a nut 235 and a bight portion 223. A non-circular bar 211 has sleeves 215 of corresponding shape to prevent rotation. A crank 201 has a hand grip 231 and is attached to a rod 232. The rod 232 has a threaded portion 234 which engages a threaded hole in a lug 233 which is in turn welded to one of the sleeves 215. A lug 237 has an unthreaded hole and is welded to the other sleeve 215. Lugs 238 are welded to the non-circular bar 211 and slidably and rotatably receive the rod 232. A sleeve 240 is received between the crank 201 and the lug 237 and, in turn, receives the rod 232. The non-circular sleeves cannot rotate on the bar and, therefore, prevent an animal having its hips received in the hip receiving members from twisting its body and thereby releasing itself from the hoist.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. An animal hoist comprising a lifting bar non-circular in cross section, means for attaching a hoisting device attached to an intermediate part of said bar, a first and a second hollow member telescopically received on each end of said bar and having a shape complementary with the shape of said bar, an externally threaded member disposed generally parallel to said bar, an internally threaded member fixed to said first hollow member and threadably receiving said externally threaded member, means on said bar restraining said externally threaded member against axial movement relative to said bar, means on said second hollow member receiving said externally threaded member and restraining the movement of said externally threaded member relative thereto, a crank on one end of said externally threaded member, and downwardly extending lifting loops, each generally U-shaped and having the ends thereof fixed to said hollow members, said crank being rotatable to move said hollow members toward and away from each other whereby said lifting loops may be clamped over the hip bones of an animal, said hollow members being non-rotatable on said bar whereby said animal cannot twist its body and thereby release itself.

2. An animal hoist comprising a beam adapted to be disposed in a generally horizontal position, clamping members, said clamping members being supported on said beam, adjusting means to move one said clamping member toward the other, said beam being non-circular in cross section and said one clamping member being slidably supported on said beam and having a complementary shaped opening therein receiving said beam and non-rotatable thereon, means for attaching a hoisting device to said hoist, and downwardly extending hip receiving members, each said hip receiving member being attached to one said clamping member, said clamping members being adapted to prevent an animal having its hips received in said hip receiving members from twisting its body to thereby release itself from said hoist.

3. An animal hoist comprising a beam adapted to be disposed in a generally horizontal position, clamping members on said beam, one said clamping member being slidably supported on said beam, adjusting means on said beam to move one said clamping member toward the other, said beam non-rotatably supporting said clamping members, means on said beam for attaching a hoisting device to said hoist, and downwardly extending hip receiving members, each attached to one of said clamping members, said clamping members being adapted to prevent an animal having its hips received in said hip receiving members from twisting its body to thereby release itself from said hoist.

References Cited in the file of this patent

UNITED STATES PATENTS

| | | |
|---|---|---|
| 807,273 | Jirus | Dec. 12, 1905 |
| 1,014,910 | Sharit | Jan. 16, 1912 |
| 1,047,104 | Moss | Dec. 10, 1912 |
| 1,807,360 | Wehr | May 26, 1931 |
| 2,655,900 | Basler et al. | Oct. 20, 1953 |
| 2,743,701 | Boyd | May 1, 1956 |
| 2,796,849 | Anderson et al. | June 25, 1957 |

Notice of Adverse Decision in Interference

In Interference No. 91,328 involving Patent No. 2,909,153, R. E. McKinley and S. J. Michael, Animal hoist, final judgment adverse to the patentees was rendered June 7, 1962, as to claim 3.

[*Official Gazette October 16, 1962.*]

Disclaimer 2,909,153.—*Raymond E. McKinley* and *Sidney J. Michael*, Erie, Pa. ANIMAL HOIST. Patent dated Oct. 20, 1959. Disclaimer filed Sept. 18, 1962, by the inventors.

Hereby enter this disclaimer to claim 3 of said patent.
[*Official Gazette November 6, 1962.*]